United States Patent [19]
Fryer et al.

[11] 3,862,313

[45] Jan. 21, 1975

[54] VIBRIO VACCINE AND IMMUNIZATION

[75] Inventors: John L. Fryer; Robert L. Garrison, both of Corvallis; Jim S. Nelson, Forest Grove; John S. Rohovec, Corvallis, all of Oreg.

[73] Assignee: The United States of America as represented by the Secretary of the Interior, Washington, D.C.

[22] Filed: Jan. 17, 1974

[21] Appl. No.: 434,180

[52] U.S. Cl. ................................................. 424/92
[51] Int. Cl............................................. C12k 5/00
[58] Field of Search ...................................... 424/92

[56] References Cited
OTHER PUBLICATIONS

Fryer et al., Progressive Fishery & Food Science S:129–133 (1972).

*Primary Examiner*—Shep K. Rose
*Attorney, Agent, or Firm*—Gersten Sadowsky

[57] ABSTRACT

An antigenic composition which provides immunization of salmonids against vibriosis is prepared by inoculating a culture medium with *Vibrio anguillarum*, growing the cells, rendering them non-viable and harvesting these cells to be used as a vaccine.

9 Claims, No Drawings

3,862,313

VIBRIO VACCINE AND IMMUNIZATION

The invention involves the immunization of fish against the disease vibriosis which is caused by the fish pathogen *V. anguillarum*. Specifically, the invention is a vaccine and a method for its preparation and a method for administering this vaccine so that fish receiving the vaccine are provided with a specific immunity to vibriosis.

BACKGROUND OF THE INVENTION

Vibriosis is a devastating disease of numerous species of fish. *Vibrio anguillarum*, the causative agent, is a gram-negative rod, motile by a single polar flagellum and is anaerogenic with a sodium chloride requirement for growth. Three biotypes of this organism are recognized. The disease is characterized by a hemorrhagic septicemia resulting in discoloration of the skin, hemorrhaging of the fins and ulcer formation which precedes death. Originally associated with red disease in eels, the bacterium is now recognized as a pathogen in other species of fish, including the codling, finnock, and rainbow trout. Vibriosis among fish is known to be world-wide in distribution, and consequently is an important factor in the management of fisheries and in the operation of marine fish farms.

It is now recognized that *V. anguillarum* is an important pathogen in all species of Pacific salmon and is a major problem in marine aquaculture of juvenile salmonids. Growth of chinook and coho salmon are rapid in these marine facilities, but losses as high at 98 percent have occurred from vibriosis as is discussed further in the article "An Epizootic of Vibriosis in Chinook Salmon" by J.O. Cisar and J.L. Fryer in a 1969 *Bulletin of the Wildlife Disease Association*, volume 5, pages 73 to 76. Attempts to control the disease by conventional methods using chemotherapeutic substances, such as terramycin, Sulmet, and Furanace (P-7138), proved expensive, and to have disadvantages such as the difficulty of feeding drugs to fish in large impoundments, drug resistance within bacterial populations, and the limited number of satisfactory drugs for use in a food fish diet which have the approval of the Food and Drug Administration. Moreover, where terramycin and sulfamethazine were fed to fish as therapy, the effects were not long lasting. Use of the vaccine described in this invention provides immunity against vibriosis and can be used to effectively reduce mortality due to this disease.

An early attempt in oral immunization of fish employed a chloroform killed preparation of *Aeremonas salmonicida*, the causative agent of furunculosis. This vaccine was fed to cutthroat trout. Among fish challenged by exposure to live *A. salmonicida*, a 25 percent mortality was observed in the vaccinated group as compared to a 75 percent mortality in a control group which did not receive vaccine. Subsequently, an alum precipitated antigen of *A. salmonicida* fed to coho salmon which were subjected to natural challenge in a salmon hatchery resulted in orally immunized fish having less than one percent mortality as compared to an unvaccinated group having a 35 percent mortality. This *A. salmonicida* immunization development is fully disclosed in U.S. Pat. NO. 3,492,900, granted Jan. 27, 1970 to George W. Klontz.

DESCRIPTION OF THE INVENTION

The unique vaccine provided by the invention and its special preparation for peroral immunization and alternatively immunization by intraperitoneal injection, afford fish prolonged significant protection against *V. anguillarum*. The immunity is considered to be twofold; one is either a secretory or cellular immunity in the gut, which is then followed by the appearance of humoral antibody in the circulatory system. The latter can be detected by simple agglutination reactions and is also considered to be protective. In general, the invention herein requires that following the growing of *V. anguillarum* cells in a proper liquid medium, a vaccine be prepared by killing the cells, harvesting them, and adapting the resulting substance to an appropriate form having special utility in a manner specified by the invention for an administration of the vaccine to fishes.

As presented herein, a disclosure of a preferred embodiment of the invention appears with reference to a development of the invention at the Department of Microbiology, Oregon State University, Corvallis, Ore. and Lint Slough salmonid rearing impoundment, Waldport, Ore. Thus, *V. anguillarum* cultures involved herein are those isolated from mortalities of salmon at Lint Slough. Vibrio colonies taken from fish parts, such as kidneys, are a suitable source material from which to derive these cultures, as is more fully explained in the above-identified article by J. O. Cisar and J. L. Fryer. Cells of *V. anguillarum* can be grown in any suitable liquid medium such as Bacto tryptic soy broth, or TGY (Tryptone 1.0 percent, glucose 0.25 percent and yeast extract 0.5 percent) + 0.25 percent NaCl, or Bacto Furunculosis media. An optimum temperature for growth is 28°C, and for maximum yield the culture should be aerated during growth. Yields can be increased by adding glucose after a 10 hour incubation period to replace the carbon source. For a mass culture method made applicable herein the bacterial cells are cultured in a broth of one of the aforementioned media, maintained at a growth temperature of 28°C, by using a Fermacell Fermentor, Model CF-50 (New Brunswich Scientific Co., Inc.). Five milliliters of Medical Antifoam C Emulsion (Dow Corning Corp.) is added to the broth before sterilization. After sterilization at 121°C, the broth is adjusted to the proper growth temperature, and inoculated with an 18 to 30 hour old two liter culture of the isolate used. The broth is aerated at a rate of 0.25 cubic feet per minute and mixed with an impeller at 200 rpm. After an 18 to 30 hours incubation, the culture is examined for purity, and thereafter harvested using a centrifuge.

An evolutionary development of a fish vaccine leading to the invention herein, first employed a lyophilized sonicate of *V. anguillarum* with procedures more fully discussed in an article by J. L. Fryer, R. L. Garrison and J. S. Nelson in *Progress in Fishery and Food Science of 1972*, volume 5, pages 129 to 133. In preparing this vaccine, 250 grams of the vibrio cells (wet weight), which had been harvested by centrifugation, were suspended in one liter of 0.3 percent formalin saline solution and mixed for 24 hours. One milliliter of the formalin-killed suspension was inoculated on Furunculosis Agar and incubated for 24 to 72 hours. Absence of growth insured nonviability of the suspension. The preparation was sonically disrupted using a Banson W185 Sonifier Cell Disruptor (Heat Systems, Inc.).

The resultant suspension was examined for disruption using phase contrast microscopy, and about 90 percent cell disruption was accepted. The sonicated suspension was lyophilized using a Virtis Model 10-145 Lyophilizer (VirTis Research Equipment, Inc.). The dried material was removed from the lyophilizer and powdered using a mortar and pestle. This vaccine preparation was stored at room temperature. Further development of a vaccine included suspending wet packed cells in saline, disrupting them by sonication until all cells had been broken, and lyophilizing the resultant substance. In a still further such development the cells were formalin-killed with 0.3 percent formaline saline solution and then lyophilized. However, in proceeding according to a preferred embodiment of the invention a wet whole cell vaccine of *V. anguillarum* is prepared by the following steps:

1. Bacterial cells are grown in a suitable liquid medium at a favorable temperature, which as was hereinbefore explained includes Trytic soy broth, or tryptone, yeast extract, and glucose, at an optimum temperature of 28°C.
2. After 24 hours growth, cells produced in step 1 are killed by mixing the medium with formaldehyde solution at a level of 0.3 percent of the total volume of culture medium.
3. Cells are harvested from the liquid fraction by centrifugation or by other appropriate methods to obtain wet packed cells. From 30 liters of medium it is possible to harvest 500 grams or more of bacteria (wet weight).
4. Whole wet packed cells thus secured in step 3, and constituting the vaccine, are frozen at −20°C for storage, and subsequently thawed at 4°C before being administered. Vaccine at this point appears as a wet paste. Preparation of the vaccine by the earlier procedures which employ the steps of sonication and lyophilization, or either of these steps, are laborious and time consuming, and therefore add considerably to the cost of preparation. Further, the preferred embodiment wet whole cell vaccine affords protection that is equal to or better than the more costly forms.

The foregoing vaccine preparation may be administered by intraperitoneal injection at a level of approximately $1 \times 10^7$ cells per animal. This vaccine may be administered with or without an adjuvant such as Freund's complete adjuvant or $Al(OH)_3$. A saline suspension containing $2 \times 10^8$ cells per milliter is mixed 1:1 with Freund's adjuvant and 0.1 milliliter is injected per animal. However, preference is given to an oral administration of the vaccine incorporated in the fish diet since it is adequately effective and much more convenient. A known fish ration designated the Oregon Moist Pellet, which is more fully described by Wallace F. Hublou in an article "Oregon Pellets" of a 1963 *Progressive Fish Culturist*, volume 25, pages 175 to 180, serves as one effective vehicle for the oral administration of the vaccine. Another such vehicle involves the Oregon test diet, which is more fully described by D. S. Lee and others in an article "Effect of Three Fatty Acids on the Growth Rate of Rainbow Trout" of a 1967 *Journal of Nutrition*, volume 92, pages 93 to 97. Immunization rations are typically prepared by homogenizing the vaccine paste, heretofore disclosed, with oils of the fish diet, such as corn oil or fish oil, mixing the resultant product with liquid components of the diet and thereafter with the dry ingredients of the diet. The mash thus produced is then forced through a pelletizing machine to secure the ration as pellets in sizes appropriate to the size of the fish to be fed.

EXAMPLE 1

Antigenic material prepared by the process set out in the description of the invention was evaluated in the following test. At a research laboratory, coho salmon (*Oncorhynchus kisutch*) were immunized by feeding 5 milligrams of wet whole cell vaccine of *V. anguillarum* per gram of Oregon moist diet for 45 days. Another group of fish were immunized by a single injection of 0.1 milliliter per fish of a 1:1 mixture of saline and Freund's adjuvant containing $3.25 \times 10^8$ cells per milliliter. A natural challenge to *Vibrio anguillarum* was provided the fish in fiberglass tanks supplied with salt water pumped from the impoundment at Lint Slough. The orally immunized and injected groups of coho experienced no mortality during 20 days exposure to vibriosis compared to 46 percent mortality for a non-immunized control group.

EXAMPLE 2

In another test to which wet whole vaccine of *V. anguillarum* was made applicable, fingerling coho salmon were separated into seven groups. Six of the groups were administered 5 milligrams of the antigenic material mixed with each gram of their food while the remaining groups served as a control. The groups of coho were fed the antigenic diet for 1, 2, 5, 7, 10 and 15 days. All groups were allowed a 15 day rest period before they were exposed to vibriosis. The mortality reported in Table 1 occurred during 20 days exposure to *V. anguillarum*.

Table 1

| Group | No. of fish | Days fed antigen | Mortality due to vibriosis (percent) |
|---|---|---|---|
| 1 | 100 | 15 | 7 |
| 2 | 100 | 10 | 13 |
| 3 | 100 | 7 | 15 |
| 4 | 100 | 5 | 15 |
| 5 | 100 | 2 | 36 |
| 6 | 100 | 1 | 37 |
| 7 (control) | 100 | 0 | 52 |

EXAMPLE 3

In another test juvenile coho salmon were fed 5 milligrams of wet whole-cell vaccine of *V. anguillarum* per gram of Oregon moist diet for 15 days at water temperatures of 39°, 44°, 49°, 54°, 59°, 64°, and 69°F. The coho were rested 15 days before exposure to *V. anguillarum* at Lint Slough. The mortalities occurring during a 20 day exposure period to the disease are listed in Table 2. Coho salmon immunized at water temperatures between 39°F and 69°F received protection from vibriosis.

Table 2

| Group | Immunization temperature (°F) | Total mortality (%) | Mortality due to vibriosis (%) |
|---|---|---|---|
| 1 | 39 | 5 | 0 |
| 2 | 44 | 3 | 0 |
| 3 | 49 | 3 | 0 |
| 4 | 54 | 4 | 1 |
| 5 | 59 | 19 | 5 |
| 6 | 64 | 8 | 0 |
| 7 | 69 | 2 | 1 |
| 8 Control – no vaccine | | 41 | 37 |

EXAMPLE 4

In other experiments rainbow trout (*Salmo gairdneri*), cutthroat trout (*Salmo clarki*), Atlantic salmon (*Salmo salar*), chum salmon (*Oncorhynchus keta*) and fall chinook salmon (*Oncorhynchus tshawytscha*) were fed wet whole cell vaccine of *V. anguillarum* and exposed to *V. anguillarum* for 20 days (Table 3).

Table 3

| Species | Milligrams vaccine per gram food | Days fed vaccine | Percent Mortality |
|---|---|---|---|
| Rainbow trout | 5 | 45 | 15 |
| (Steelhead) | 5 | 30 | 36 |
| (12 months old) | 5 | 15 | 44 |
|  | 0 | control | 66 |
| Atlantic salmon | 8 | 30 | 37 |
| (18 month old) | 0 | control | 77 |
| Chum salmon | 1 | 30 | 2 |
| Fingerlings | 1 | 30 | 24 |
|  | 0 | control | 42 |
|  | 0 | control | 89 |
| Cutthroad trout | 2.5 | 30 | 38 |
| Fingerlings | 0 | control | 96 |
| Fall chinook salmon | 8 | 45 | 4 |
| Fingerlings | 0 | control | 82 |

EXAMPLE 5

Further tests wherein wet whole-cell vaccine of *V. anguillarum* was made applicable were conducted to determine what dosages of the vaccine are effective in providing immunity. Table 4 shows that fish fed 0.5 mgs of vibrio vaccine per gram of ration were protected when challenged naturally. A subsequent experiment showed that increasing the dosage to 10 mgs. of vaccine per gram of ration also provided adequate protection to fish challenged at Lint Slough for 20 days.

Table 4

| Number of fish in group | Amount of vaccine/gm of ration | % mortality due to vibriosis |
|---|---|---|
| 100 | 0 (control) | 24 |
| 100 | 0.5 mg | 1 |
| 100 | 2 mg | 1 |

EXAMPLE 6

In general, oral immunization involves feeding the fish a diet containing the wet whole-cell vaccine of *V. anguillarum* for a given time (Examples 1 and 2), at a satisfactory temperature (Example 3), and providing a suitable period following immunization before exposure to the disease.

It will be understood that the present invention is not limited to the immunization of fish named hereinabove, but includes other fish such as flounder, plaice, as well as eels. Further to be understood is that the invention is not limited to the particular embodiment or methods described, but embraces all such modified forms as may come within the scope of the following claims.

We claim:

1. In a process for preparing an antigenic material for the immunization of fish against vibriosis disease, the improvement eliminating sonic disruption and lyophilization consisting of the steps of:
   a. Inoculating a bacteriological culture medium including Trytic soy broth, or tryptone, yeast extract, and glucose, which supplies all metabolic requirements, with the bacterium *V. anguillarum*;
   b. incubating said inoculated culture in a liquid medium at 28°C, an optimum temperature, for at least 24 hours, a period of time sufficient to produce substantial numbers of bacterial cells;
   c. treating said liquid medium with formaldehyde solution to obtain killed whole cells of said culture; and
   d. harvesting said killed whole cells in a wet packed condition.

2. A vaccine consisting essentially of either an adjuvant or fish food admixed with an immunilogically effective amount of whole cell *V. anguillarum* antigen produced by the process of claim 1.

3. A method for the immunization of fish against vibrio disease which comprises administering to said fish immunologically effective amounts of a wet, while cell *V. anguillarum* antigen produced by the process of claim 1.

4. The method of claim 3 wherein said vaccinated fish are allowed a period of time to acquire immunity before exposure to vibriosis.

5. The method of claim 3 wherein said fish comprise hatchery-reared salmonids comprising salmon, trout, flounder, plaice, and eel.

6. The method of claim 3 wherein said antigen is administered to fish by intraperitoneal injection.

7. The method of claim 3 wherein said antigen is administered to fish by admixture with food normally supplied to said fish.

8. The method of claim 7 wherein each gram of said food supplied to said fish is admixed with an amount of antigen in the range of from 0.5 to 10 milligrams, and said admixture is supplied to said fish for a period in the range of from 10 to 45 days.

9. The method of claim 7 wherein said admixture is supplied to said fish in fresh water having a temperature at no less than approximately 39°F, and no more than approximately 75°F.

* * * * *